No. 813,005. PATENTED FEB. 20, 1906.
C. HULT.
PAPER PRESSING ATTACHMENT FOR RECORDING INSTRUMENTS.
APPLICATION FILED DEC. 31, 1903.
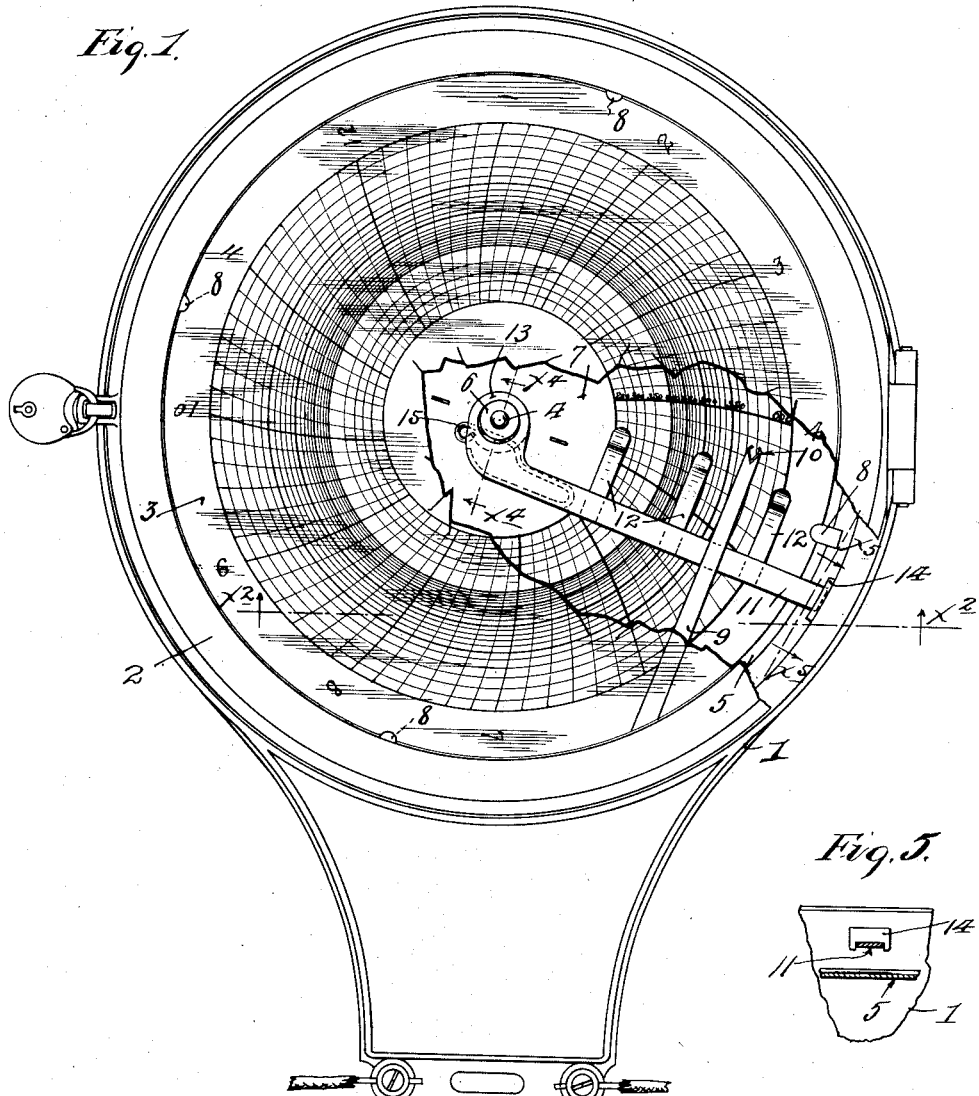
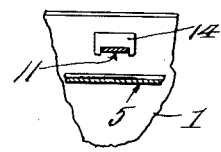
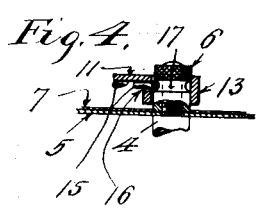
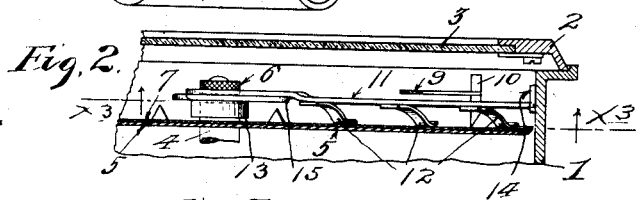
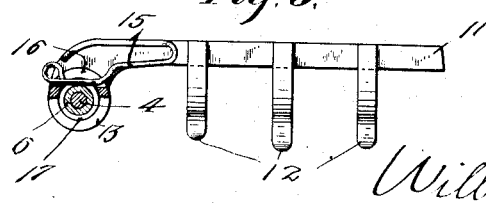

UNITED STATES PATENT OFFICE.

CHARLES HULT, OF MINNEAPOLIS, MINNESOTA.

PAPER-PRESSING ATTACHMENT FOR RECORDING INSTRUMENTS.

No. 813,005.　　　　　　Specification of Letters Patent.　　　　Patented Feb. 20, 1906.

Application filed December 31, 1903. Serial No. 187,288.

*To all whom it may concern:*

Be it known that I, CHARLES HULT, a citizen of the United States, residing at Minneapolis, in the county of Hennepin and State of Minnesota, (whose post-office address is 508 Sixteenth avenue southeast, Minneapolis,) have invented certain new and useful Improvements in Paper-Pressing Attachments for Recording Instruments; and I do hereby declare the following to be a full, clear, and exact description of the invention, such as will enable others skilled in the art to which it appertains to make and use the same.

My invention has for its object to provide an improved attachment for self-recording instruments which employ a chart or thin sheet of paper upon which the record is marked by means of an automatically-actuated pen or stylus.

My improved attachment is especially adapted for application to recording instruments of the character generally known to the trade as the "Bristol recorders," which general term includes volt-meters, registering-thermometers, ammeters, steam-pressure recorders, &c.

Instruments of the above character employ a disk or chart which is caused to rotate by clockwork at a predetermined speed. A graduated chart formed of thin paper is secured to and carried by this rotating dial or disk. The recording-mark on the paper record-disk is made by a pen which is automatically moved according to the varying pressure or to the voltage or flow of the electric current or to the variation in temperature, according to the character of the instrument.

In practice I have found that it is practically impossible to cause the paper chart to lie perfectly flat at all points against the rotary disk which carries it, and hence that bulges will occur at various points on its face. These bulges or uneven surfaces of the chart acting on the pen or stylus will cause it to lag back, so as to produce a line which does not properly represent the record which should be recorded. In other words, the accuracy of the instrument is destroyed or impaired by all unevennesses or irregularities in the surface of the chart.

It will of course be understood that in instruments of this character the recording pen or stylus requires to be adjusted with great nicety and that its action is a very delicate one, which is easily interfered with.

I remove the above defect in the action of the recording-pen by the provision of an extremely simple device in the nature of a detachable supporting-bar having a plurality of light spring-fingers that engage the paper recording-disk very close to the line of travel thereover of the recording-pen, and thus keep that portion of the said paper recording-disk which is acted upon by the pen pressed closely against the rotating supporting-disk which carries it. In this way the surface of the paper recording-disk at the point or place where it is engaged by the pen is always kept the constant predetermined relation to the pen, so that the pen will produce thereon a recording-line of constant intensity.

The invention is illustrated in the accompanying drawings, wherein like characters indicate like parts throughout the several views.

Figure 1 is a view in front elevation, showing a recording instrument which may be assumed to be a volt-meter having applied thereto one of my improved disk pressing devices, some parts of the case of said instrument being removed. Fig. 2 is a detail in horizontal section on the line $x^2$ $x^2$ of Fig. 1, some parts being broken away. Fig. 3 is a detail in section on the line $x^3$ $x^3$ of Fig. 2, some parts being broken away and some being removed. Fig. 4 is a detail in section approximately on the line $x^4$ $x^4$ of Fig. 1, and Fig. 5 is a detail in section on the line $x^5$ $x^5$ of Fig. 1.

The numeral 1 indicates the case of the indicator or recorder, which case is provided, as is usual, with a hinged annular frame 2, that carries a crystal or disk-like glass pane 3.

The numeral 4 indicates the automatically-actuating rotary spindle of the instrument, which spindle is located at the axis of the case 1 and carries a metallic disk 5, which is secured thereto in the usual way by a knurled thumb-nut 6, working on the screw-threaded end of said stem 4.

The numeral 7 indicates the graduated paper record-chart, which is detachably held on the face of the carrying-disk 5 by a plurality of spring-lips 8, carried by the peripheral portion of said disk 5.

The automatically-actuated marking-arm 9 carries at its free end the usual pen 10, which marks upon the face of the chart 7.

My improved attachment is afforded by a light metallic bar 11, which at its intermediate portion carries a plurality of spring presser-fingers 12 and at one end is formed with a hub 13, that is adapted to telescope loosely over the knurled nut 6 of the stem 4. The free end of the bar 11 is adapted to be engaged under a notched retaining-lug 14 on the side of the case 1, and to secure the hub end of said arm in working position it is provided with an approximately U-shaped spring 15, one end of which is secured to said bar and the free end of which works in a slot 16 of said hub 13 and projects beyond the same so that it may be engaged by the finger. For coöperation with the free end of the spring 15 the nut 6 is formed with a peripheral groove 17, which receives the said free end of the spring to detachably hold the bar 11 in working position.

The several spring-fingers 12, it will be noted by reference particularly to Fig. 1, press upon the paper recording-chart 7 at points that lie in the same curved line close to the line of movement of the pen 10, as already more fully stated.

The attachment above described is of very small cost, may be applied in working position very quickly, and may be quickly removed from position, and, furthermore, is efficient for the purposes had in view.

It will of course be understood that the device described is capable of modification within the scope of my invention as herein set forth and claimed.

What I claim, and desire to secure by Letters Patent of the United States, is as follows:

In an instrument of the character described, the case 1 having the retaining-lug 14, the rotating stem 4 screw-threaded at its outer end and having a nut 6 with groove 17, the record-carrying disk 5 clamped to said stem 4, by said nut 6, and the automatically-vibrated arm 9 having the pen or stylus 10, in combination with the detachable bar 11 interlocking at its free end with said lug 14 and provided at its inner end with the hub 13 and spring 15, said hub fitting over said nut 6 and said spring engaging with said groove 17 thereof, and the plurality of spring-fingers 12 on said bar 11, for pressing a paper recording-chart against the said rotary carrying-disk, substantially as described.

In testimony whereof I affix my signature in presence of two witnesses.

CHARLES HULT.

Witnesses:
 ELIZABETH H. KELIHER,
 F. D. MERCHANT.